April 22, 1958 C. E. LOMAX 2,831,924

TELEPHONE SYSTEM

Filed May 26, 1953 4 Sheets-Sheet 1

INVENTOR.
CLARENCE E. LOMAX
BY [signature]
ATTY.

INVENTOR.
CLARENCE E. LOMAX
BY Mc Watter Owen.
ATTY.

INVENTOR.
CLARENCE E. LOMAX
BY *McWatters Owen*
ATTY.

April 22, 1958 C. E. LOMAX 2,831,924

TELEPHONE SYSTEM

Filed May 26, 1953 4 Sheets-Sheet 4

INVENTOR.
CLARENCE E. LOMAX
BY [signature]
ATTY

United States Patent Office 2,831,924

Patented Apr. 22, 1958

2,831,924

TELEPHONE SYSTEM

Clarence E. Lomax, Chicago, Ill., assignor to General Telephone Laboratories, Incorporated, a corporation of Delaware Application May 26, 1953, Serial No. 357,596

2 Claims. (Cl. 179—6.3)

The present invention relates to telephone systems in general and more particularly to a telephone system wherein metered calls and paystation calls may be serviced by the same group of finder-selector links for local calls or by the same combined line recording trunk on toll calls.

Although it is desirable to have paystations serviced by the same equipment used to furnish service to metered subscribers because of the economy derived therefrom, expensive means must be provided for differentiating between the types of subscriber services and for providing services and operations in accordance with the type of service to which the calling party is entitled, and therefore such systems have presented numerous problems which have reduced their utility.

Accordingly, among the objects and features of this invention is to provide the aforementioned services and operations in an economical manner and with the reduction in the amount of equipment that has heretofore been necessary.

Another object of this invention is to provide a paystation circuit wherein the coin collect and refund magnets are prevented from pulsing during dialling thereby providing improved transmission of dialling pulses and also eliminating the necessity of reversing the trunk between the paystation repeater and the paystation when battery is reversed back to the repeater from the connector on answer by a called party as has heretofore been done.

Another object of the present invention is to have common equipment for metered subscribers and paystations which performs only metering operations, when a metered subscriber is calling, while providing automatic collect or refund potential for the coin magnet operation only when a paystation is calling, and to automatically differentiate between local and toll calls for each type of subscriber and provide the corresponding type of service.

Other objects and features include the arrangement for identifying a paystation call, the automatic operation of the coin magnets and the test arrangement for determining if a coin is disposed of.

The present invention contemplates the use of the coin magnets in series with neon lamps. The use of a neon lamp is disclosed in the well-known Gray type paystation system such as shown in Patent No. 2,226,730, issued to Lomax, December 31, 1940. However, in the present circuit one side of the magnets is grounded through contacts which open during dialling. Insertion of the neon lamps in the grounded side of the line prevents ground from holding the switches after the called party has released the connection but before the calling party replaces his handset. The grounded condition that exists without the insertion of the lamps has necessitated reversal of the trunk to the paystation when battery is reversed on answer by the called party in previous paystation arrangements.

The paystations are prepay type paystations and as used in the present system are connected to the eighth, ninth and zero levels of the finder banks while the metered subscribers are connected to the other levels of the finder banks so that when the finder is stepped to the level of the calling line it may differentiate between the types of calling lines in a manner to be explained. The finder-selector links are similar to those disclosed in Patent No. 2,513,426, issued to Lomax, July 4, 1950, with the exception that the finder is provided with normal post springs which complete a circuit to ground when the finder is stepped to the eighth, ninth and zero levels where the paystation lines terminate in the finder banks. A paystation control trunk is provided between each finder and selector in the present system, so that if ground is forwarded from the finder to the paystation control trunk, the coin magnet is automatically operated therefrom on a local call for a collect or refund operation dependent on whether the local call was completed successfully or not. A completed local call by a metered subscriber results in the trunk controlling the meter at the subscriber's line for registering the call as ground is not forwarded from the finder to the control trunk, because the metered subscribers' lines are connected from the first to seventh levels inclusive of the finder banks.

If the call is a toll call, the selector on dialling is stepped to its zero level where it seizes a combined line recording trunk. If the call is initiated from a paystation, a ground is forwarded from the control trunk through the selector to the combined line recording trunk so that it operates to automatically refund a deposited coin and thereafter the operator may request the deposit of the proper number of coins before completing the connection. A metered subscriber on reaching the combined line recording trunk is thereafter not metered as the combined line recording trunk does not reverse battery to initiate a metering operation in the paystation control trunk and the operator may charge the subscriber in accordance with the toll call.

Referring to the drawings,

Fig. 1 shows the details of the paystation circuit. The line circuits of the paystation and metered subscriber B are shown in block form. Likewise the finder is shown in block form with the exception that normal post springs are shown as closing on the eighth, ninth or zero level to complete a circuit from ground previously prepared in any well-known manner such as by a transfer relay in the finder for providing initial differentiation between metered and paystation initiated calls.

Figure 1:
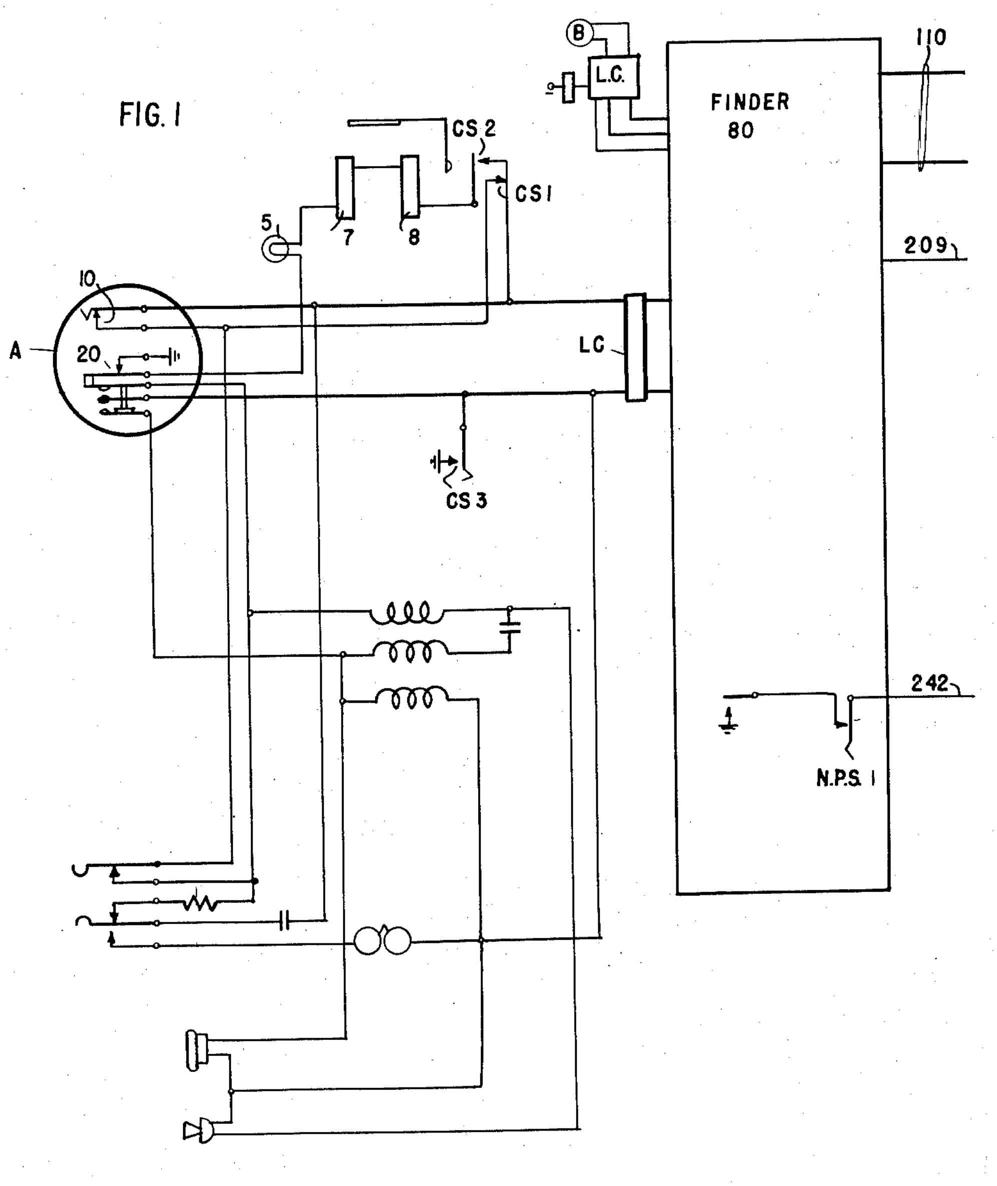
Figure 2:
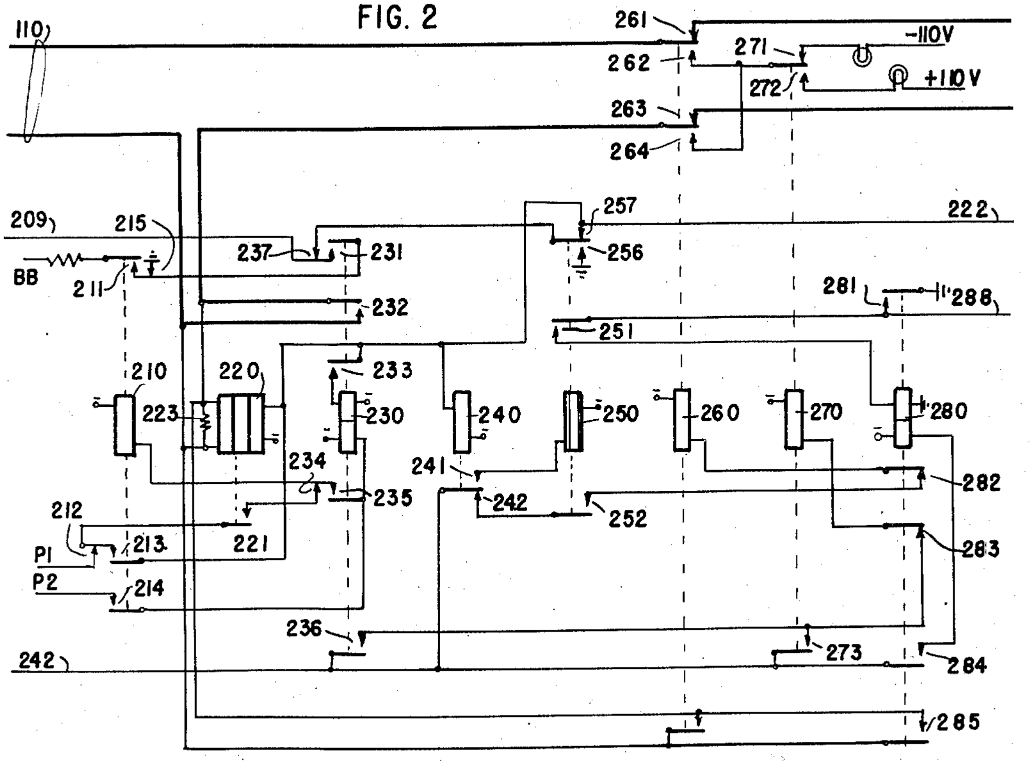
Fig. 2 shows the details of the paystation control trunk which provides metering for metered subscribers on a local call and automatic collect or refund coin operation on a local call from a paystation.

For use in understanding the description will be divided into four parts: a local call by a metered subscriber, a toll call by a metered subscriber, a local call from a paystation and a toll call from a paystation.

*Local call by metered subscriber*

A call by a metered subscriber is initiated in any well-known manner on the subscriber lifting his handset. This of course, causes finder 80 to search for the subscriber's line in the finder bank. As this subscriber's line is not terminated in the eighth or higher levels of the finder bank, the normal post springs 1 of the finder 80 are not closed when the finder searches for the calling line. After the finder has found the line, the loop 110 is completed through contacts 261 and 263 to energize the usual line relay of the selector 300 in the well-known manner and cause dial tone to be immediately sent back to the subscriber. The calling subscriber now dials the number of the called local subscriber C and completes the connection through connector D in any well-known manner. On answer by the called party battery is reversed at the connector in the usual manner.

A circuit was completed to the right hand winding of relay 220 and the winding of relay 240 over conductor 222 on seizure of the selector 300 which returned ground over conductor 222 in the well-known manner. This ground is also returned over contacts 237 to hold the preceding finder 80. Relay 220, being polarized, was not operated at that time. Relay 240 closed contacts 241 to prepare a circuit to slow-to-release relay 250 which however does not operate as the normal post springs 1 are not closed to ground conductor 242.

Reversal of battery on the trunk 110 on answer by the called party causes shunt wound polar relay 220 to operate in a well-known manner and close contacts 221. Immediately thereafter a ground pulse from a timing device (not shown) is received over conductor P1 over contacts 212, 221 and 234 to operate relay 210 which closes contacts 211, 213 and 214 and opens contacts 215. A moment later a ground pulse is received over conductor P2 over contacts 214 which energizes the lower winding of relay 230 to close contacts 231, 232, 233, 235 and 236 and open contacts 234 and 237. Closing of contacts 231 completes a circuit for the booster battery to be applied to the subscriber's meter over C lead 209. Closing of contacts 232 shunts the left hand winding of polar relay 220 which now releases. This also improves transmission. The upper winding of relay 230 energizes and is held energized over contacts 233 and ground on conductor 222. Contact 236 closes for no purpose at this time as there is no ground on conductor 242. Closing of contacts 235 holds relay 210 operated while the ground pulse over P2 is applied so that booster battery is fully applied over contacts 211, 231 and C lead 209 to operate the subscriber's meter in any well-known manner. Ground pulses over P1 and P2 repeating themselves later no longer complete any circuits as relay 210 releases in the time interval between the P2 and P1 pulses to allow contacts 214 to open and contacts 221 have already opened. Opening of contacts 214 prevents a second energization of the lower winding of relay 230. Ground is now returned over contacts 215, 231 and C lead 209 to hold the finder 80.

No further circuits are completed in the control trunk and when the parties terminate their conversation and replace their handsets, the selector 300 and finder switch 80 are released in the well-known manner. Ground is then removed from C conductor 222 to open the circuit to relay 240, the upper winding of relay 230 and the right hand winding of relay 220.

*Toll calls by metered subscriber*

A toll call by any subscriber is initiated by dialling the digit 0 after the selector has been seized to in turn cause the selector to seize a combined line recording trunk. The selector 300 is battery searching and it finds battery over conductor 302, contacts 473, 435 and 499 on an idle trunk. The trunk loop 110 will now be extended from contacts 261 and 263, through the selector, over contacts 341, 371, 381, −L line of trunk 405, repeating coil 406, the upper winding of relay 480 to battery on one side and over the other side through contacts 343, 373, 383, +L line of trunk 405, repeating coil 407, the lower winding of relay 480 to ground. Relay 480 operates and closes contacts 481, 483 and 484 and opens contacts 482. Closing of contacts 483 closes a circuit to signal lamp 488 over contacts 433 to signal the operator. Contacts 484 on closing complete a circuit to slow-to-release relay 410 over contacts 424. Relay 410 operates and closes contacts 411 for a purpose to be described. Closing of contacts 481 completes a circuit to slow-to-release relay 470 over contacts 481 and 444. It in turn operates to complete an obvious circuit to slow-to-release relay 460 at contacts 471. Relay 460 closes contacts 461 to prepare for a paystation test tone. As this call is a metered call no paystation tone will be heard and the operator will accordingly know the type of calling party. Relay 470 also opens contacts 473 to remove battery and closes contacts 472 to place ground on conductor 302 instead and hold the preceding selector switch.

On seeing the signal lamp lighted the operator plugs in to complete a talking circuit over repeating coil windings 406' and 407' so that she may converse with the calling party to complete the connection and ticket the call. Simultaneously, contacts 491 at the operator's jack are closed to complete a circuit to relay 440 which closes contacts 443 and opens contacts 444. Closing of contacts 443 operates relay 430 which in turn operates relay 420 at contacts 431. Relay 420 closes contacts 422, 423 and 425 and opens contacts 421 and 424. Relay 430 opens contacts 433 to open the circuit to signal lamp 488 and completes an alternate circuit for itself over contacts 483 and 432. At contacts 434 relay 430 grounds conductor 302 at another point to provide a holding ground for the preceding switch when contacts 472 are opened, while at contacts 435 it prevents battery from being returned over conductor 302. Contacts 424 on opening breaks the circuit to relay 410 and it will release after a short interval. Operation of relay 420 and its associated contacts complete no circuits on a metered call as ground is not forwarded over lead 303 to operate relay 360 when contacts 425 close. As long as the operator retains her jack in the plug relays 420, 430, 440 and 480 only remain operated on a metered call.

On release of the connection, the loop extending to relay 480 is opened and relay 480 releases to in turn open contacts 481, close contacts 482 and open contacts 483 and 484. Closing of contacts 482 completes a circuit (not shown) in any well-known manner for notifying the operator that the connection is released and she may remove her plug from the jack 402 to allow relay 440 to release. Opening of contacts 483 allows relay 430 to release when contacts 443 open on release of relay 440 by removal of the plug to in turn allow the release of relay 420. Release of relay 430 allows contacts 434 to open and remove ground from conductor 302 to allow the release of selector 300. Release of selector 300 in turn removes ground from conductor 222 to allow release of the finder switch 80.

*Local call by paystation*

A party at a paystation on removing the handset from the hook can not initiate dialling without the deposit of a coin as contacts CS1 shunt the dial springs 10 if no coin is deposited in the coin chute. Therefore before the party at paystation can initiate the dialling operation a coin must be deposited to close contacts CS2 and CS3 and open contacts CS1. The collect and refund magnets will not be pulsed however during the dialling as contacts 20 are opened when the dial is turned off-normal. Neon lamp 5 in series with the collect and refund magnets prevents their operation until the high collect or refund voltage is placed on the line at which time neon lamp will ionize. The neon lamps will also prevent the line relay of the succeeding switch from being held after the called party hangs up and the battery has been reversed without the necessity of reversing the trunk.

The finder of course in searching for the bank contacts of the paystation line is stepped to its eighth, ninth, or zero levels to close normal post springs N. P. S. 1 and ground conductor 242. After the calling line is found and the line relay of the selector is energized circuits are again completed to relays 240 and to the right hand winding of relay 220 when ground is placed on conductor 222 in the selector. Relay 240 operates as before described but this time the closing of contacts 241 forwards ground from conductor 242 to slow-to-release relay 250 which operates to close contacts 251, 252, 256 and open 257. Springs 251 apply ground to conductor 288 from the ground on the right side of the upper winding of relay 280 for no purpose in the present operation. Dialling of the desired connection of course proceeds after the calling party hears dial tone.

If the call is not answered, battery is not reversed on the trunk from the connector and relay 220 will not operate, and therefore relays 210 and 230 will not operate. The selector switch on releasing after the calling party has hung up removes ground from conductor 222 and allows relay 240 to release and breaks the circuit to the right hand winding of relay 220. The finder 80 will not release as yet as slow-to-release relay 250 maintains contacts 256 closed to provide a holding ground over contacts 237, and C lead 209 for the finder. Relay 240 on releasing closes contacts 243 to forward ground from conductor 242 over contacts 243, previously closed contacts 252 of slow-to-release relay 250, contacts 282 to relay 260. Relay 260 on operating closes contacts 262 and 264 to apply negative 110 volt refund potential over contacts 271, 262 and 264 respectively, to both sides of the trunk 110, over contacts CS2, the coin magnets 7 and 8, ionized neon lamp 5, and off-normal contacts 20 to ground, to operate the magnets in one direction for refunding the coin. Shortly thereafter relay 250 will release to open contacts 252 to in turn release relay 260. Fnder 80 releases as ground is removed from conductor 222 after slow-to-release relay 250 releases to open contacts 256 and remove the holding ground from C lead 209.

If the call is successfully completed and the called party answers, battery is reversed on the trunk from the connector switch and relay 220 operates to in turn repeat the previously described sequence for operating relay 210 and relay 230. Relay 230 on operation closes contacts 236 to forward ground from conductor 242 over contacts 236 and 283 to operate relay 270. Relay 270 completes a holding circuit at contacts 273 from conductor 242 and also closes contacts 272 to prepare for a collect operation of the coin magnets. Booster battery applied to the C lead 209 has no effect as the party at the paystation has no meter. On termination of the call and release of the selector switch, relay 240 and the upper winding of relay 230 are released as previously described. The circuit to relay 260 is again completed. Relay 260 closes contacts 262 and 264 to apply positive 110 volt collect potential from contacts 272 to the trunk 110 and the coin magnets in a manner previously described for operating them. This time they operate in the other direction to collect a deposited coin. Relay 250 which maintains a holding ground for the finder 80 after relay 230 releases, itself releases shortly after the collect operation to open contacts 252 and open the circuit to relay 260. It also opens contacts 256 to release the finder switch and therefore normal post springs N. P. S. 1 are opened to release relay 270. It will be noted at this time that even if the called party has not replaced his handset the loop will be broken to allow release of the switches after the calling party has hung up even though the trunk has not been reversed and battery has been reversed as ground cannot be sent from contacts 20 through the neon lamp to hold the line relay operated at the other end of the loop. This condition in other systems has necessitated the reversal of the trunk to prevent the line relay from being held operated when the calling party replaces his handset.

*Toll calls by a paystation*

Initiation of a toll call by a party at a paystation of course necessitates the deposit of a coin to enable the party to dial. Finder switch 80 on searching for the calling line is stepped to the eighth, ninth or zero levels to close normal post springs 1 and ground conductor 242 as previously explained. Relay 240 is operated from ground on conductor 222 which is grounded in the selector and it operates slow-to-release relay 250 from the ground on conductor 242 as previously explained. Relay 250 grounds conductor 288 at contacts 251.

Figure 3:
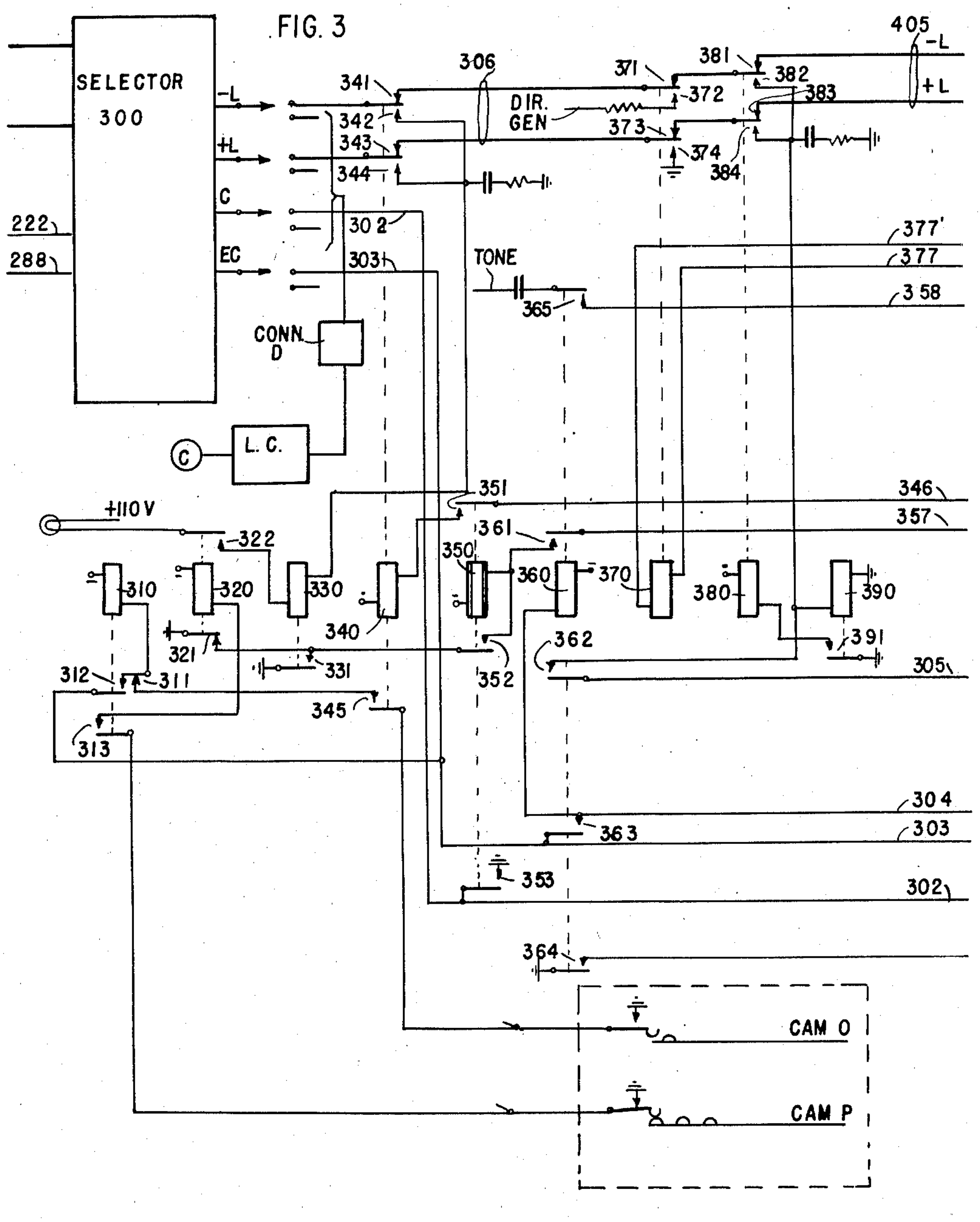
Figs. 3 and 4 show details of the combined line recording trunk and in block form the previously mentioned selector and connector and a local called subscriber C.
Figure 4:
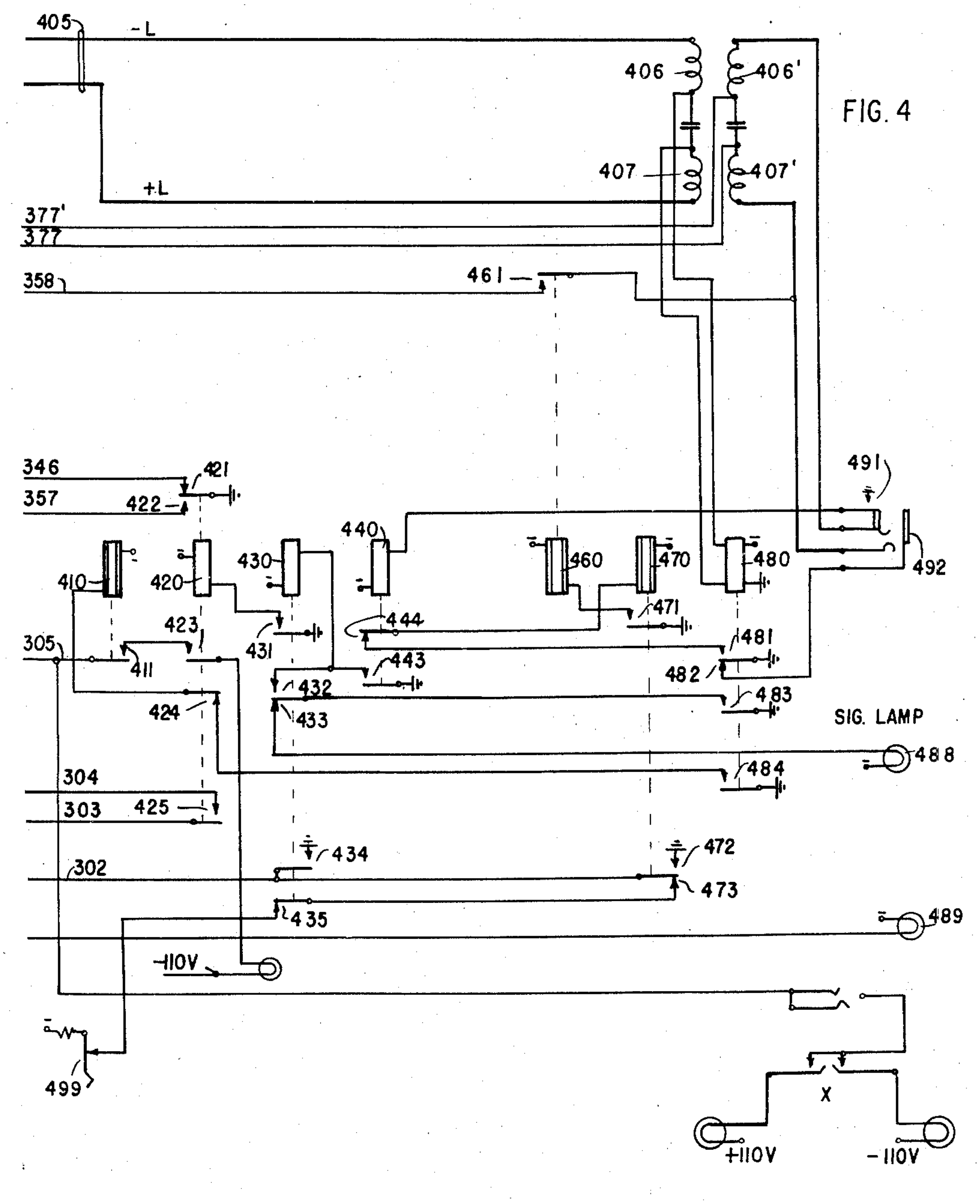

The party at the paystation dials the number 0 to cause the selector 300 to seize a combined line recording trunk shown in Figures 3 and 4 and as previously described a loop to relay 480 is completed and relay 480 operates. Relay 480 closes contacts 481, 483 and 484 and opens contacts 482 and as before described the signal lamp 488, and relays 470, 460 and 410 are operated. This time ground is forwarded from conductor 288 over the EC wiper of selector 300 to conductor 303. When the operator inserts her plug in the jack 492, relay 440 is again operated to open the circuit to slow-to-release relay 470. Relay 440 in turn operates relay 430 which in turn operates relay 420 and opens the circuit of lamp 488 at contacts 433. Closing of contacts 425 this time forwards ground to relay 360 from conductor 303 over conductor 304. Relay 360 closes contacts 361, 362, 363, 364 and 365. Closing of contacts 364 completes a circuit to the lamp 489. Closing of contacts 363 completes a holding circuit for relay 360 from the ground on conductor 303. Closing of contacts 361 completes a circuit to slow-to-release relay 350 over contacts 422, conductor 357 and contacts 361. Relay 350 completes an alternate circuit for itself over contacts 321 and 352.

Relay 350 closes contacts 351 to prepare a circuit to relay 340 and at contacts 353 places an alternate ground on conductor 302 so that the preceding switches may be held after relay 420 releases for a purpose to be explained. Battery on one side of relay 360 is of course forwarded back over conductor 303, the EC wiper of selector 300, conductor 288, and contacts 251, to the upper winding of relay 280 and it operates to close contacts 284 and 285. Relay 280 on operating now directly grounds conductor 288 at contacts 281. Closing of contacts 285 shunts the left hand winding of polar relay 220 and the resistor 223 to improve transmission. Closing of contacts 284 forwards ground from conductor 242 to energize the lower winding of relay 280. Opening of contacts 282 and 283 prevents any operation of relays 270 and 260. Closing of contacts 365 completes a paystation test circuit over conductor 358 and contacts 461 if relay 470 has not released to allow relay 460 to release. If the operator has lagged in listening after inserting her plug and relays 470 and 460 have released, and it is too late to identify the tone; she may remove her plug to release relay 440 to allow relays 470 and 460 to reoperate and re-insert her plug to hear the paystation identification tone before relay 470 and 460 release. Relay 430 of course remains operated, if the plug is withdrawn, over its alternate circuit, contacts 483 and 432 while relay 440 is released.

Closing of contacts 362 prepares a circuit for applying refund potential to the trunk and relay 390, before relay 410 releases, from —110 volt source over contacts 423, 411, conductor 305 and contacts 362 to relay 390. Relay 390 operates to complete an obvious circuit at contacts 391 to relay 380 which in turn closes contacts 382 and 384 to apply said refund potential to trunk 306 through contacts 371 and 373 and from there over the rest of the calling loop to operate the coin magnets in one direction for refunding a deposited coin. Shortly thereafter relay 410 releases, due to its circuit having been opened at 424 by relay 420, to open contacts 411 and break the circuit to relay 390 which releases to in turn release relay 380.

The operator having identified the calling line as a paystation requests the desired information and solicits the deposit of the proper number of coins which may be identified in any well-known manner. If the operator requires a long period of time to complete the connection the calling party may hang up but the operator may ring the calling party by operating her key to complete a circuit to relay 370 over conductors 377 and 377′ in any well-known manner which in turn will operate to apply ringing current to the trunk at contacts 372 and 374.

At the end of the conversation when the calling party replaces his handset the loop to relay 480 is opened and relay 480 releases to in turn close contact 482 and inform the operator that the connection is finished. The operator on removing her plug releases relay 440 to in turn release relay 430 as contacts 483 have already opened, which in turn releases relay 420. The selector switch however is still held as ground is applied to conductor 302 at contacts 353. Relay 420 on releasing closes contacts 421 to complete a previously prepared circuit over conductor 346 and contacts 351 to relay 340. Relay 340 closes contacts 342, 344 and 345 to prepare the trunk for collect potential and prepare a circuit to relay 310.

A timer which is already operating periodically closes contacts which are commonly connected to all the combined line recording trunks. The timer is any well-known type of mechanism such as a motor controlled shaft having cams mounted thereon which periodically close contacts associated with each cam such as cams O and P. The contacts associated with cam P are closed three times per revolution of the shaft while the contacts associated with cam O close only once and that immediately after the first closing of the contacts associated with cam P and before their second closing. As the contacts associated with cam O are closed a circuit is completed over contacts 345 and 311 to relay 310. Relay 310 operates and closes contacts 312 and 313 and opens contacts 311 to break its previous operating circuit. Relay 310 will be held operated from the ground on the conductor 303 over contacts 312. Immediately after cam O operated its cam contacts, the second lobe on cam P closes the associated contact to complete a circuit for relay 320 over contacts 313. Relay 320 opens contacts 321 to open the holding circuit for relay 350 and closes contacts 332 so that positive 110 volt collect potential is sent through relay 330, over contacts 342 and 344 and over the loop to operate the coin magnets for collecting coins deposited in the coin chute at the paystation. Relay 330 closes contacts 331 so that relay 350 which is slow-to-release is held operated for a short time longer in order to hold relay 340 operated for testing to determine if the coin magnets succeeded in disposing of the coin. When the coin is collected, coin springs CS2 open to prevent the circuit through relay 330 from being completed the next time cam P closes its contacts to reoperate relay 320. If the coin is not collected when relay 320 closes contacts 322, relay 330 and the coin magnets will reoperate to again try to collect the deposited coins. If relay 330 is not operated on the second closing of the contacts associated with cam P, relay 350 will not receive another pulse to hold it operated and therefore it will release by the time cam P closes its contacts for the third time. On the other hand if the coin is not collected on the second attempt the process will be repeated on the third closing of the contacts associated with cam P.

An alternative collect or refund operation is provided at X so that the operator may if it is desirable operate the coin magnets for either collect or refund operations over conductor 305, contacts 362, contacts 382, 384 and rest of the loop after first causing the operation of relays 390 and 280.

Release of the selector will occur somewhere during the period after the third lobe of cam P has operated the associated cam contacts as relay 350 being completely released will allow contacts 353 to open and remove ground from conductor 302. The release of the selector of course removes ground from conductor 222 and allows the finder 80 to release after relay 250 releases in a manner already explained. Release of the finder in turn will open normal post springs 1 to remove ground from conductor 242 to in turn cause the release of the lower winding of relay 280. Release of relay 250 also opened the circuit to the upper winding of relay 280 which in turn removes the holding ground at contacts 281 from conductor 288, the EC wiper of the selector and conductor 303 and the circuit of relay 360 is opened. Release of relay 280 does not occur until relay 250 has released thereby preventing operation of relay 260 and the application of collect potential to the trunk 110 and the coin magnets. Relay 310 releases on removal of ground from conductor 303 and prevents reoperation of relay 320. Release of relay 360 extinguishes the lamp 489 at contacts 364 to signal release of the connection. This lamp has kept operator informed that the trunk is in use so that she can interrupt to request the deposit of more coins if the call extends beyond a predetermined period.

Thus having described an arrangement whereby metered subscribers and paystations may be serviced on both local and toll calls by common equipment together with other features associated therewith what I claim is:

1. In a telephone system, prepay paystation lines and non-paystation lines, a coin magnet at each paystation line connected to its associated line on deposit of a coin at its associated station, a plurality of switches accessible to each line and arranged to be seized and operated in tandem for extending a continuous metallic connection from any calling line to each successive switch on seizure for extending a connection to another line, answer discriminating means in said metallic connection operated on reversal of battery on answer by a party at a called line, other means operated on release of an unanswered connection extended from one of said paystation lines for controlling the coin magnet thereat to refund a deposited coin, last means operated by said discriminating means for operating a meter at a calling non-paystation line on answer of a connection therefrom, and means including part of said other and said last means operated under control of said operated discriminating means for controlling the coin magnet at a prepay paystation line to collect a deposited coin on release of an answered connection extended from said prepay paystation line.

2. In a telephone system, prepay paystation lines and non-paystation lines, a coin magnet at each paystation line connected to its associated line on deposit of a coin at its associated station, a plurality of switches accessible to each station and arranged to be seized and operated in tandem for extending a continuous metallic connection from any calling line to each successive switch or seizure for extending a connection to another line or to a CLR trunk, answer discriminating means in said metallic connection operated on reversal of battery on answer by a party at a called line, means operated by said discriminating means for operating a meter at a calling non-paystation line on answer of a connection extended therefrom and operated for controlling the coin magnet at a prepay paystation line to collect a deposited coin on release of an answered connection extended from said prepay paystation line, and a test circuit including said metallic connection completed from a CLR trunk in response to the release of a connection extended to said CLR trunk from a prepay paystation line for reacting to the operation of the coin magnet at said paystation on the application of coin magnet potential thereto from said CLR trunk to prevent the application of further coin magnet potential thereto.

References Cited in the file of this patent

UNITED STATES PATENTS

| | | |
|---|---|---|
| 2,367,769 | Goddard | Jan. 23, 1945 |
| 2,615,092 | Lomax | Oct. 21, 1952 |
| 2,644,040 | Lomax | June 30, 1953 |
| 2,655,558 | Kessler | Oct. 13, 1953 |
| 2,700,069 | Pharis | Jan. 18, 1955 |